United States Patent [19]
Reichenbach et al.

[11] Patent Number: 6,039,253
[45] Date of Patent: Mar. 21, 2000

[54] METHOD AND APPARATUS FOR THE RECOGNITION AND READING OF A BAR CODE

[75] Inventors: Jürgen Reichenbach, Emmendingen; Heinrich Hippenmeyer, Freiamt, both of Germany

[73] Assignee: Sick AG, Waldkirck, Germany

[21] Appl. No.: 09/090,031

[22] Filed: Jun. 10, 1998

[51] Int. Cl.[7] .................................................. G06K 7/10
[52] U.S. Cl. ........................ 235/462.01; 235/468.18; 235/468.1
[58] Field of Search .................... 235/462.01, 472.01, 235/462.09, 462.1, 462.11, 462.16, 462.18, 462.19, 462.25, 462.41, 462.42

[56] References Cited

U.S. PATENT DOCUMENTS

| | | |
|---|---|---|
| 4,096,992 | 6/1978 | Nojiri . |
| 5,326,961 | 7/1994 | Sibata . |
| 5,561,283 | 10/1996 | Dvorkis . |
| 5,612,544 | 3/1997 | Busch . |

FOREIGN PATENT DOCUMENTS

| | | |
|---|---|---|
| 3538219A1 | 5/1986 | Germany . |
| WO 96/07155 | 3/1996 | WIPO . |

*Primary Examiner*—Thien M. Le
*Attorney, Agent, or Firm*—Townsend and Townsend and Crew LLP

[57] ABSTRACT

A method and an apparatus are described for the recognition and reading of a bar code provided on an object and consisting of a plurality of code elements. The object carrying the bar code is scanned by one or more scanning beams of a bar code reader, wherein each time a scanning beam sweeps over an object a scan is formed and bright and dark regions of an object swept over during a scan are recognized as scanned elements. A width index is determined for at least some of the elements scanned during a scan and is in each case representative for the width of the element in the scanning direction. Furthermore the frequency of occurrence of the width indexes found is in each case determined and a conclusion is drawn on the presence of a bar code from the frequencies that are found.

27 Claims, 5 Drawing Sheets

METHOD AND APPARATUS FOR THE RECOGNITION AND READING OF A BAR CODE

FIELD OF INVENTION

The present invention relates to a method for the recognition and reading of a bar code provided on an object and consisting of a plurality of code elements. Furthermore the invention is directed to an apparatus, in particular for carrying out this method.

DESCRIPTION OF PRIOR ART

Bar codes are normally terminated at their start and at the end by so-called white zones, i.e. non-printed regions. Through these white zones, which have a specified minimum extent, it is ensured, often also in connection with start and stop markings, that customary decoding methods recognize the start and end of a bar code respectively. They thus only attempt to decode exclusively bar code information and not stray printed information, i.e. elements which are printed on the object and are falsely interpreted as being code elements.

However, as a result of space problems on the object, it can not be ensured in all cases that a bar code is terminated with white zones in accordance with the norm. In addition, with oblique scanning of a bar code with a scanning beam, it cannot be assumed that during sweeping of the scanning beam over the bar code an eventually present white zone will also be swept over. Thus, in these cases, it is also not possible to distinguish between stray printing and a bar code through recognition of a white zone.

PRINCIPLE OBJECT OF THE INVENTION

The object of the invention is to set forth a method of the initially named kind in which scanned bar codes or bar code sections can be recognized with a high probability and distinguished from scanned stray printing, even when no white zone is swept over by the scanning beam during scanning.

BRIEF DESCRIPTION OF THE INVENTION

This object is satisfied in accordance with the invention in that the object bearing the bar code is scanned by one or more scanning beams of a bar code reader, wherein each time a scanning beam sweeps over the object a scan is formed and bright and dark regions of the object swept over during a scan are recognized as scanned elements; in that, for at least some of the elements scanned during a scan, a width index is respectively formed which is representative for the width of the element in the scanning direction; in that the frequency of occurence of the width indexes that are found is in each case determined, and in that a conclusion is drawn on the presence of a bar code from the frequencies that are determined.

The invention starts from the fundamental consideration that the width of the code elements within a bar code to be recognized can only assume specific known values. In this respect both the bars and also the gaps of the bar code are termed code elements. With a two width code in which the bar code consists of code elements with two different widths only two different desired widths can thus be found during an ideal scan, i.e. without print distortions or contamination, when determining the width of the scan code elements. A corresponding situation applies to a three width code, in which, in the ideal case, only three different desired widths of the scanned code elements can be found, etc.

In contrast, elements which are not part of a bar code, but rather represent stray printing, for example printed text or other marks, have arbitrary, differing widths, so that the widths of these elements which are found during a scan are fully arbitrary.

In the method of the invention a width index is determined during a scan for each of the scanned recognized elements and is representative for the width of the element in the scanning direction. The width index can also be given directly by the width of the element itself. Thereafter, the frequency of occurrence of the width indexes that are found is determined in a frequency distribution, a so-called histogram, from which a conclusion can be drawn as to the presence of a bar code. If the scanned elements are exclusively the code elements of a bar code then the frequency distribution has in the ideal case only maxima at the values which characterize the desired widths of the respective bar code type, whereas the frequency distribution is equal to zero between these maxima. In the real case the width indexes that are found are predominantly arranged around the desired widths in such a way that only individual width indexes, which are brought about by errors in the print pattern, or by other disturbing influences, are formed between the desired widths. Despite the lack of clarity which arises in reality in the printed pattern the frequency distribution of the width indexes of a bar code is clearly distinguished from the frequency distribution of the width indexes of printing, which normally does not have any pronounced maxima, but rather a relatively uniform course.

In order to enable a simple assessment of the scanned elements the width indexes are selected in a preferred embodiment of the invention from a plurality of predetermined discrete values. In this way a situation is achieved in which the fluctuations which occur in practice of the width indexes that are found, which can for example be brought about by unclear printing, do not lead to an incomprehensible plurality of different width indexes to be compared, but rather to a situation in which, for example through rounding up to the next, predetermined, discrete value, only a restricted number of the width indexes that are found have to be checked with respect to the desired widths of the bar code to be recognized.

The time duration for the sweeping of the scanning beam over an element, and from this time duration the width index for this element, can preferably be determined during a scan. A simple determination of the width indexes for the scanned elements is possible through the measurement of the time duration. In this respect the determination of the time duration can take place by the counting of a clock signal, with in each case the number of clock signals which are counted during the scanning of an element being used as the respective width index. In this case no direct determination of the width of the scanned elements thus takes place, because the same width index can be associated with elements of different widths, for which the same number of clock signals are counted when scanning them. Through a careful choice of the clock rate a situation can be achieved in which elements which have substantially the same width have the same width index allotted to them, whereas differences in the element width that are detected, which are simply brought about by disturbing influences or by faulty printing, are simultaneously eliminated.

If the scanning speed and also the width of the code elements of the bar code to be recognized are known then the number of clock signals which are respectively counted during the scanning of a code element can be determined in advance and in each case stored as a desired width index for these code elements. During the scanning of the object to be checked the actually found width indices can then be compared with the desired value indexes stored for the code elements.

In accordance with a further advantageous embodiment of the invention the determination of the width indexes in each case takes place for a number of sequential elements defining a scanning window, with the total width of the number of sequential elements being shorter than the running length of the bar code to be recognized. The subdivision of a scan into different scanning windows has the advantage that, when the scanning window is selected to be sufficiently small, only code elements of the bar code and not stray printing are detected and evaluated, even when the scanning beam sweeps obliquely over a bar code. In this respect the length of the scanning window can be determined by two opposite boundary conditions. On the one hand the scanning window should be selected to be as large as possible so that the probability that stray printing detected in the scanning window contains exclusively elements having widths corresponding to the width of the code elements of the bar code to be detected is kept as small as possible. On the other hand the length of the scanning window must be kept as small as possible so that, even with very oblique scanning of the bar code, no stray printed elements come to lie in the scanning window, and thereby falsify the assessment within the scanning window. Depending on the application the length of the scanning window must be selected to lie between the total running length of the bar code to be recognized and, for example, one tenth of this value.

A decoding of the scanned bar code preferably takes place when the presence of a bar code is recognized in at least two sequential scanning windows. By forming a series of a plurality of sequential scanning windows the probability of reliable recognition of the bar code is increased. In this manner the scanning windows can be selected to be relatively small because stray printing, which is incorrectly classified as a bar code section within a scanning window does not lead directly to a faulty assessment are formed between the desired widths. The elements recognized in the sequential scanning windows are only interpreted as code elements and correspondingly decoded when the scanned elements are likewise classified as code elements of a bar code in a certain number of sequential scanning windows. It is, however, basically also possible to carry out a decoding of the scanned bar code when the presence of a bar code is recognized in a only scanning window. The scanning window can in this respect represent one of a plurality of sequential scanning windows, or also the single scanning window within a scan.

In accordance with a further preferred embodiment of the invention the elements which lie within the scanning window are recognized as code elements of a bar code when the number of width indexes that are found which respectively lie in a predetermined range around the desired width indexes of the code elements is significantly larger than the number of the width indexes that are found which lie outside of these ranges. Through the comparison of the width indexes that are found not only with the desired width indexes of the code elements, but rather with values within a range around the desired width indexes, it is ensured that code elements having actual widths which differ somewhat from their normal widths, such as is for example the case with printed distortions by running ink, are correctly interpreted as code elements and not as stray printing. In this respect faults in the printed pattern of the bar code, which can, for example, arise through contamination or poor print quality are simultaneously taken into account by the comparison of the numbers of the width indexes that are found inside and outside of the predetermined regions.

In accordance with a further advantageous embodiment of the invention a quality criterion G is determined as a characteristic for the presence of a bar code, with the scanned elements being recognized as code elements of a bar code, when the scanning criterion G does not exceed a predetermined threshold value but rather falls short of it.

Through the use of a quality criterion a simple automatic assessment of the width indexes that are found is possible. The quality criterion G is preferably determined by the following formula:

$$G = \frac{\sum_{x \in L} f(x) \cdot h(x) - \sum_{x \in L} g(x) \cdot h(x)}{N}.$$

In which h(x) specifies the frequency distribution of the width indexes that are found and f(x) is an assessment function for h(x). The assessment function f(x) should in this respect be selected so that width indexes found in the predetermined ranges around the desired width indexes of the code elements receive a higher assessment, for example by multiplication with a high factor, whereas width indexes lying between these regions receive a low assessment and are for example multiplied by 0.

The precise shape of the assessment function f(x) can be selected in diverse manner, with the ideal shape of f(x) being learned for example in a teach-in-method. For this purpose different assessment functions can be used during the learning process and the respectively determined results for plurality of scanned bar codes can be compared. The assessment function with which the highest recognition rate is achieved can then be stored as the standard assessment function.

For example an assessment function f(x) can be selected as $$f(x) = \begin{cases} a & \text{for } x_{Si} - y \leq x \leq x_{Si} + z, i = 1, \ldots, n \\ 0 & \text{otherwise,} \end{cases}$$

wherein a is an arbitrary number not equal to zero, in particular a=1, y and z are arbitrary numbers, n is the number of the different desired width indexes of the code elements of the bar code to be recognized and $x_{si}$ are the different desired width indexes of a code element of the bar code to be recognized in each case.

Through the assessment function f(x) width indexes which are found, and which lie within a predetermined range around the desired width indexes of the code elements of the bar code, are assessed with the value a, in particular with 1, while the width indexes that are found which lie between these ranges are multiplied by zero and thus blended out. In place of these rectangular pulses around the desired width indexes Gauss-shaped pulses or other suitable shapes can be used around the desired width indexes. g(x) is essentially the complement of f(x) through which the width indexes found within the ranges lying around of the desired width indexes are given a low assessment or blended out, for example by multiplication with zero, whereas the width indexes that are found between these ranges receive a high assessment, for example by multiplication with a high factor.

For example g(x) can be selected as $$g(x) = \begin{cases} 0 & \text{for } x_{Si} - y \le x \le x_{Si} + z, i = 1, \ldots, n \\ b & \text{otherwise,} \end{cases}$$

wherein in particular b is selected to be equal to a. Thus the width indexes that are found within the ranges lying around the desired width indexes of the code elements are blended out by multiplication with zero, whereas the width indexes that are found that lie between them are multiplied by the value b, in particular by 1.

Since L is the quantity of the width indexes that are found and N is the number of the elements just scanned within a scanning window G becomes 1 in the ideal case when all the width indexes that are found are arranged within the predetermined ranges around the desired width indexes of the code elements. The smaller the number of the elements that are swept over for which the width indexes that are found are arranged within the predetermined ranges, the smaller is the value for the quality criterion G. Thus the quality criterion G is a measure for the probability of the presence of a bar code during a scan. If the quality criterion G is determined in accordance with a further embodiment of the invention by the formula $$G = \frac{\sum_{x \in L} f(x) \cdot h(x)}{\sum_{x \in L} g(x) \cdot h(x)},$$

then the probability that a bar code was scanned within the scanning window also increases here with an increasing value of the quality criterion G. In the ideal case the quality criterion goes to infinity here.

In accordance with a further preferred embodiment of the invention the ratio of the width indexes of the scanned element to that of the following or preceding element is used in place of the width index of a scanned element. Furthermore, instead of the desired width indexes of a code element the ratios of the desired width indexes of the code elements of the bar code to be recognized are used. Through the evaluation of the ratios of the width indexes of two sequential scanned elements a situation is achieved in which the maxima of the frequency distribution of the width indexes that is found are arranged at specific, fixed, predetermined positions within the frequency distribution, independently of the scanning speed, and the reading distance and also the printing scale of the bar code, i.e. of the actual width of the printed code elements. Thus the maxima for example lie with a two width code with the print ratio 3:1 in which the code elements have a single or triple unit width, at the values 1/3=0.33, 1/1=1 and 3/1=3.

In accordance with a further preferred embodiment of the invention the logarithm of the width indexes is used instead of the width indexes. Through this logarithmic evaluation of the values on the abscissa of the associated histogram an independence is also achieved from the scanning speed, the printing scale and the reading distance. The spacing between the maxima of the frequency distribution for different element widths at the same print ratio is in particular of the same size with such a logarithmic assessment of the width indexes. Since different scanning speeds, different printing scales and different reading distances result in different widths, and thus in different width indexes of the code elements that are found, the dependency on these factors can be eliminated through the logarithmic assessment. A simpler evaluation of the histogram that is found is also possible thereby.

Further advantageous embodiments are set forth in the subordinate claims.

BRIEF DESCRIPTIONS OF THE DRAWINGS

The invention will be described in more detail in the following with reference to embodiments and to the drawings in which are shown.

DETAILED DESCRIPTION

Figure 1:
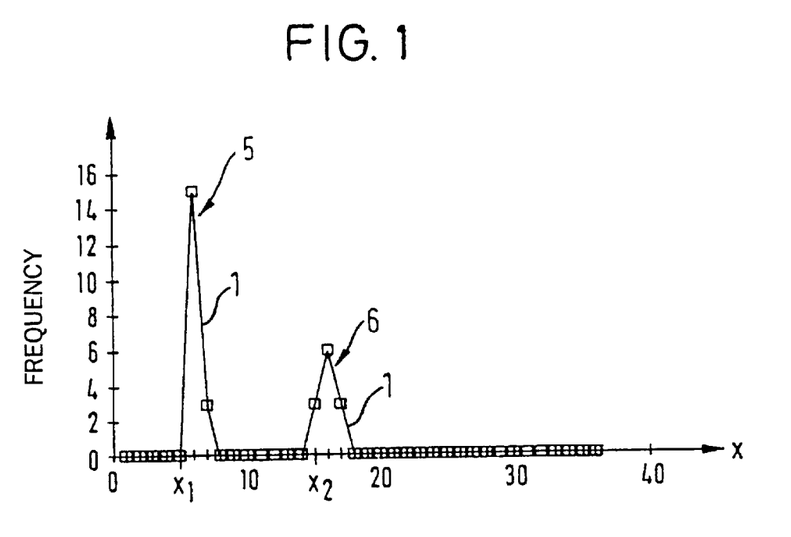
FIG. 1 the frequency distribution of the width indexes that are found for a two width code, FIG. 2 the frequency distribution of the width indexes that are found for a two width code with changed widths of the code elements in comparison to the representation shown in FIG. 1, FIG. 3 a corresponding frequency distribution of the width indexes in the scanning of stray printing, FIG. 4 the frequency distribution of the width indexes for a four width code, FIG. 5 the frequency distribution in accordance with FIG. 2 with additional illustrated assessment functions, FIG. 6 the frequency distribution of FIG. 4 with additionally illustrated assessment functions, FIG. 7 a quality function which is used for the determination of the probability of whether a bar code is present, FIG. 8 the frequency distribution in accordance with FIG. 1 with a logarithmic assessment of the values on the abscissa, FIG. 9 the frequency distribution of FIG. 2 with a logarithmic assessment of the values on the abscissa, and FIG. 10 the frequency distribution of the ratio of the width indexes of two sequential code elements of a two width code.

FIG. 1 shows in a histogram the frequency distribution 1 of the width indexes x of a scanned two width code with a print ratio of 3:1, i.e. in which the code elements have widths in the ratio 3:1. The width indexes x were found by counting clock pulses which were summed during the sweeping of the scanning beam over a code element, with the desired width values resulting in the present case as $x_1=5$ and $x_2=15$.

The scanning window within which the scan code elements were evaluated were so selected that N=30 elements were scanned and their respective width indexes were found. In accordance with FIG. 1 fifteen code elements were recognized with the width index 6, three code elements with the width index 7, a further three code element with the width index 15, six code elements with the width index 16 and three code elements with the width index 17. One recognizes clearly with respect to the maxima 5 and 6 of the frequency distribution 1 that all the width indexes x that are found are arranged around the desired width indexes $x_1$ and $x_2$. The deviations of the width indexes that are found from the desired width indexes can be explained by tolerances in the printing and/or in the scanning. For example, the printed code elements can have a width which is greater than the desired width as a result of running of the ink.

Figure 2:
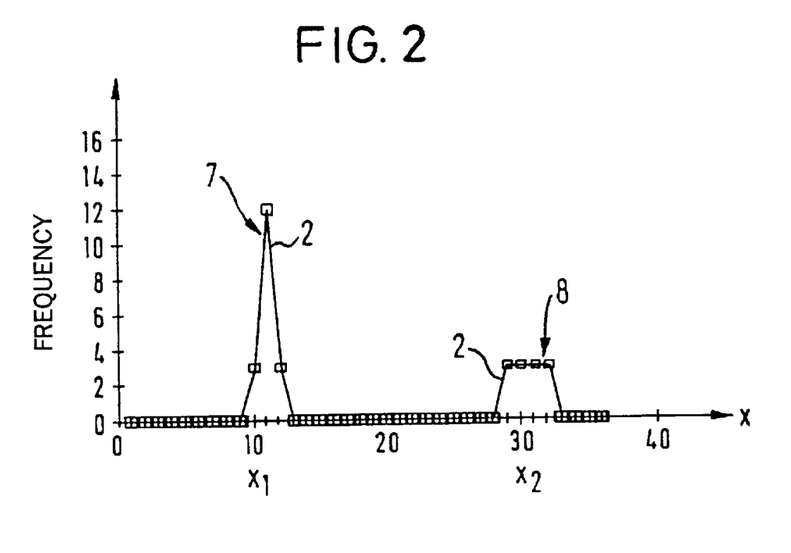

FIG. 2 shows the frequency distribution 2 of the two width code illustrated in a histogram in which the code elements have desired width indexes of $x_1=10$, $x_2=30$, so that the maxima 7 and 8 of the frequency distribution 2 lie close to these values. In accordance with the narrower code elements three width indexes of ten clock pulses, twelve width indexes of eleven clock pulses and a further three width indexes of twelve clock pulses were found during a scan. In accordance with the broader code elements three width indexes of twenty-nine clock pulses, of thirty clock pulses, of thirty-one clock pulses and thirty-two clock pulses were respectively recognized.

It is also evident from FIG. 2 that the width indexes that are found are respectively arranged in regions around the desired width indexes $x_1$ and $x_2$ of the code elements.

It is evident both from FIG. 1 and also from FIG. 2 that the frequency distributions 1 and 2 have pronounced maxima 5, 6, 7, 8 in the region of the desired width indexes $x_1$ and $x_2$ whereas the frequency distributions 1, 2 are in each case equal to zero in the region between the desired width indexes.

Figure 3:
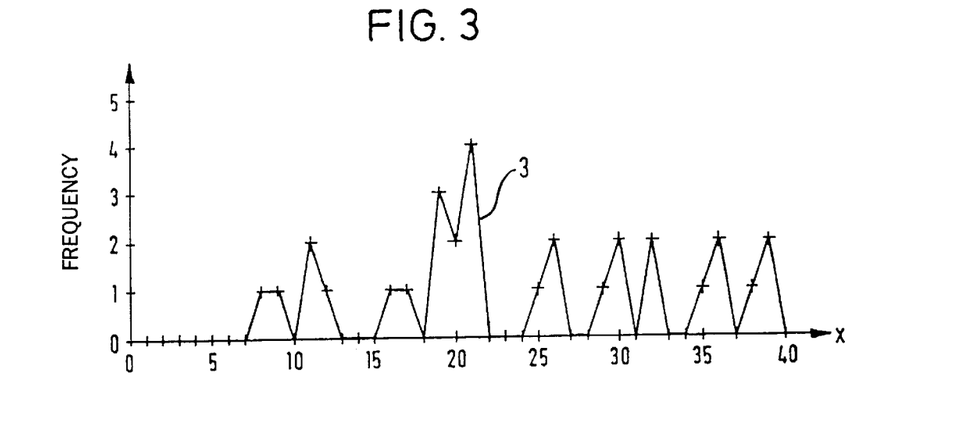

In contrast the histogram shown in FIG. 3 which represents the frequency distribution 3 of the width indexes x found during the scanning of stray printing has no pronounced maxima. During the scanning of the stray print, which may for example be text or other arbitrary information, a plurality of more or less regularly occurring width indexes is found whereby the frequency distribution 3 shown in FIG. 3 results.

One can clearly recognize the distinction between the frequency distributions 1 and 2 which arise during the scanning of a bar code with two pronounced maxima when compared with the more or less uniformly extending frequency distribution 3 in accordance with FIG. 3 which arises when scanning stray print.

Figure 4:
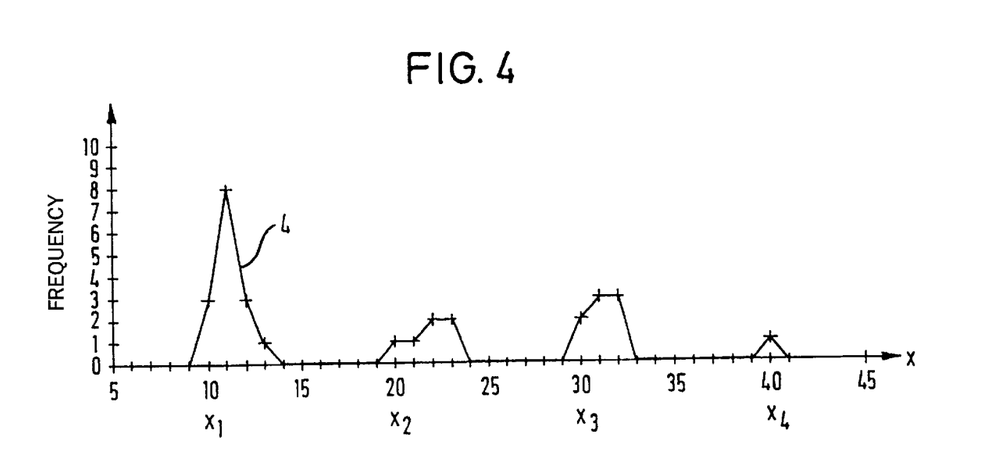

The histogram shown in FIG. 4 represents the frequency distribution 4 of the width indexes x for a four width code (code 128). The desired width indexes of the code elements amount to $x_1=10$, $x_2=20$, $x_3=30$ and $x_4=40$. As in the frequency distributions in accordance with FIG. 1 and 2 the scanning window was so selected that N= thirty code elements were covered and their width indexes determined.

The frequency distribution 4 also has maxima which are arranged around the desired width indexes $x_1$ to $x_4$. The frequency distribution 4 corresponds to the statistical distribution of the individual code element width in four width codes, since the narrow elements of the width index $x_1$ are most frequent within a four width code and the broad code elements with the width index $x_4$ are the rarest within a four width code.

The comparison between FIGS. 4 and 3 also clearly shows the distinction between the frequency distribution 4 of the width indexes of a four width code and the frequency distribution 3 of the width indexes which are found when scanning stray print.

Figure 5:
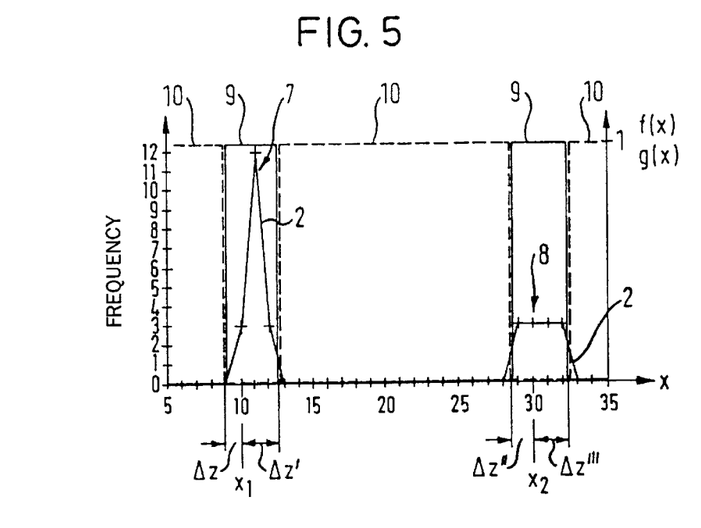

In FIG. 5 an assessment function f(x) 9 and also an assessment function g(x) 10 are shown alongside the frequency distribution 2 of the width indexes x of a two width code already illustrated in FIG. 2.

The assessment function f(x) 9 has the functional value 1 in a range $x_1-\Delta z \leq x \leq x_1+\Delta z'$ and also in a further range $x_2-\Delta z'' \leq x \leq x_2+\Delta z'''$ and the functional values 0 outside of these ranges. The evaluation function g(x) 10 is made inverse thereto, i.e. it has the functional value 0 within the quoted ranges and the functional value 1 outside of these ranges.

The probability that code elements of a bar code are scanned within a scanning window can be estimated through the assessment functions f(x) and g(x) in that the frequency distribution is weighted with the selected assessment functions. For this purpose the frequency of all the width indexes that are found is for example multiplied with the corresponding functional value of the assessment function f(x) and the respectively calculated products are summed up for all the width indexes that are found. In this manner the frequency of the width indexes that are found which are arranged within the ranges provided around the desired width indexes are calculated while the width indexes which lie between these ranges are blended out by multiplication with 0.

Accordingly, for all the width indexes that are found their frequencies are multiplied with the corresponding functional values of the assessment function g(x) and added up, whereby the total frequency of the width indexes which lie between these regions is determined.

Thereafter the total sum of the frequencies of the width indexes lying between the regions is subtracted from the total sum of the frequencies of the width indexes arranged within the regions and the result is divided by the total number N of the elements scanned within the scanning window.

The quality criterion G find in this manner is equal to 1 in the ideal case, i.e. when all the width indexes found lie within the regions arranged around the desired width indexes and is smaller the more width indexes are found that are arranged outside of these regions. Thus the quality criterion G gives a measure for the probability that a bar code is sensed inside the scanning window.

Instead of forming the difference of the respective summated products formed between the frequency distribution h(x) and each of the assessment functions f(x) and g(x), and subsequent division by the number N of the elements that is swept over, an alternative quality criterion G can for example be calculated by forming the ratio of the summated products of the frequency distribution h(x) with the assessment function f(x) and the summated products of the frequency distribution h(x) and the assessment function g(x). The quality criterion G calculated in this manner is larger the more the width indexes that are found are arranged within the predetermined regions around the desired width indexes. Thus this quality criterion G can also be useful in determining the probability that a bar code or a bar code section was swept over within a scanning window.

The values $\Delta z$, $\Delta z'$, $\Delta z''$ and $\Delta z'''$ can thus be differently selected, as is shown in FIG. 5, so that the regions are asymmetrically formed around the desired width indexes $x_1$ and $x_2$. In this way printing distortions which bring about a broadening of the code elements relative to the desired width can, for example, be taken into account. It is however also possible to select the values $\Delta z$, $\Delta z'$, $\Delta z''$ and $\Delta z'''$ to be of the same size, so that the regions around the desired width indexes $x_1$ and $x_2$ are made symmetrical and of the same size.

Figure 6:
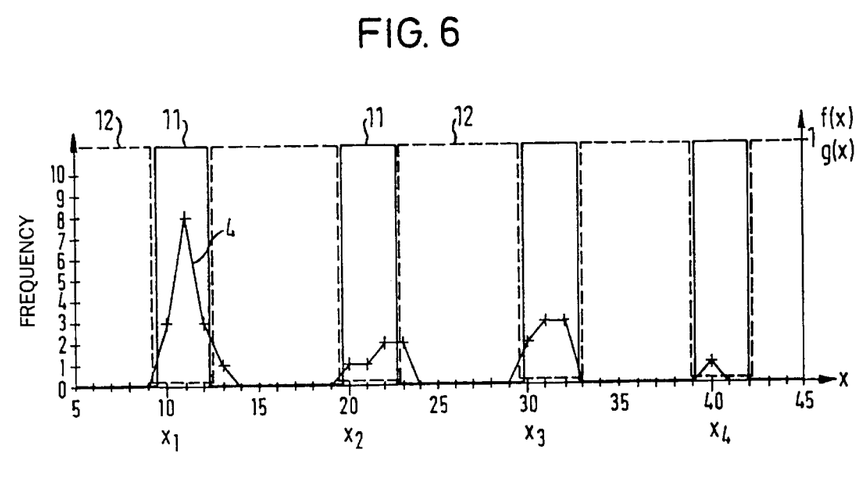

FIG. 6 shows the frequency distribution 4 for a four width code such as was already shown in FIG. 4. In addition FIG. 6 shows both the assessment function f(x) 11 and the inverse assessment function g(x) 12.

It is evident from FIG. 6 that of the thirty width indexes that are found indeed three (at the width indexes 13 and 23) are not arranged within the regions around the desired width indexes $x_1$, $x_2$, $x_3$ and $x_4$. Thus, when evaluating one of the quality criteria G a value arises which points to a high probability for the presence of a bar code.

If the scanning window is selected to be relatively small then a relative larger value for the quality criterion G can be calculated by chance, although no bar code but rather stray printing was scanned within the scanning window. This is the case when the scanned stray printing contains elements having width indexes which are substantially the same as the width indexes of the code elements of the bar code to be recognized. In order to increase the probability for the correct assessment of whether a bar code is present or not a plurality of sequential scanning windows can be evaluated, wherein a bar code counts as having been recognized when the calculated quality criterion for several sequential scanning windows exceeds a predetermined threshold value in each case.

Figure 7:
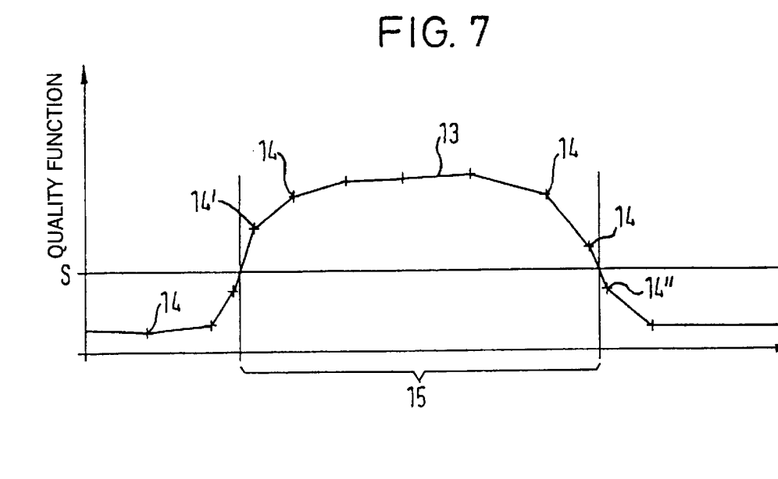

This is shown in FIG. 7. FIG. 7 shows a quality function 13 which consists of a plurality of mutually connected values 14. The values 14 respectively represent calculated values of a quality criterion which were respectively calculated for sequential scanning windows. Furthermore, FIG. 7 shows a threshold value S which, when exceeded by the values of the respective quality criterion, is regarded as meaning that the bar code has been recognized.

A region 15 represents the length of a bar code which is covered by seven scanning windows, wherein a value 14 of the quality criterion which lies above the threshold value S was calculated for each of these scanning windows. Outside of the region 15, i.e. outside of the bar code the values 14 of the quality criterion are arranged beneath the threshold value S. When the scanning beam sweeps over the object carrying the bar code respective quality criteria are thus calculated in sequential scanning windows and have values which lie beneath the threshold value. Thus the respectively scanned regions are not classified as bar code sections.

In the course of the further scanning the threshold value S exceeded for the first time by the value 14' so that the region of the bar code swept over within this scanning window is classified as a bar code section. Since the calculated value 14 of the quality criterion in each case lies above the threshold value S for an adjustable number of sequential scanning windows, the scanned regions are classified as regions of the bar code in which the threshold value S was exceeded for the first time by the quality criterion.

In this manner the scanning and evaluation is continued until the value 14" of the quality criterion falls for the first time beneath the threshold value S. The region 15 of the object scanned prior to this point in time in the sequential scanning windows is classified as bar code and decoded with conventional decoding methods.

Figure 8:
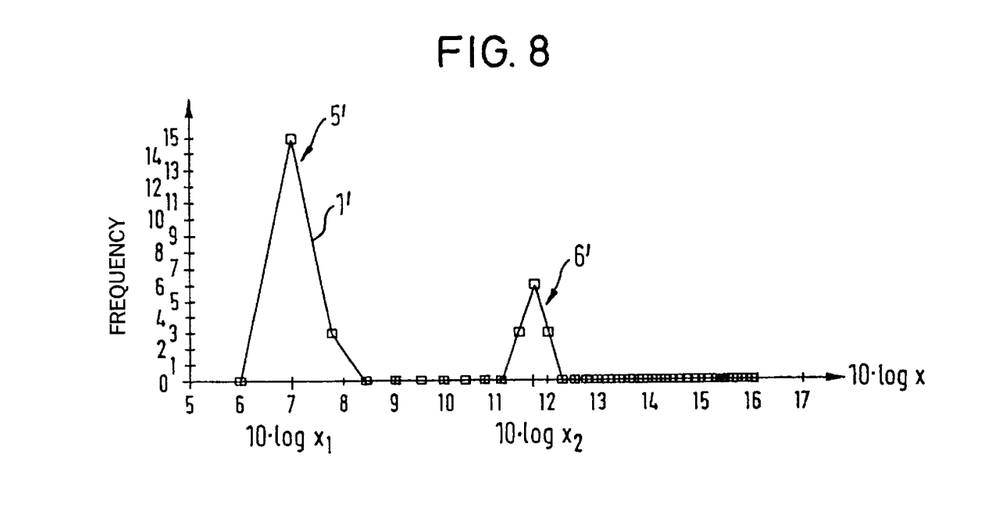

The frequency distribution 1' shown in FIG. 8 represents the frequency distribution 1 of FIG. 1 with the width indexes x not being shown linearly but rather logarithmically. The same applies to the illustration of FIG. 9 which shows a frequency distribution 2' which corresponds to the frequency distribution 2 of FIG. 2 with a logarithmic portrayal of the width indexes x.

In contrast to the non-logarithmic representations of FIGS. 1 and 2, in which the spacings between the maxima 5 and 6 and also the maxima 7 and 8 are different, the maxima 5' and 6' and 7' and 8' respectively have the same distance from one another, namely circa 4.7 units of the abscissa.

Figure 9:
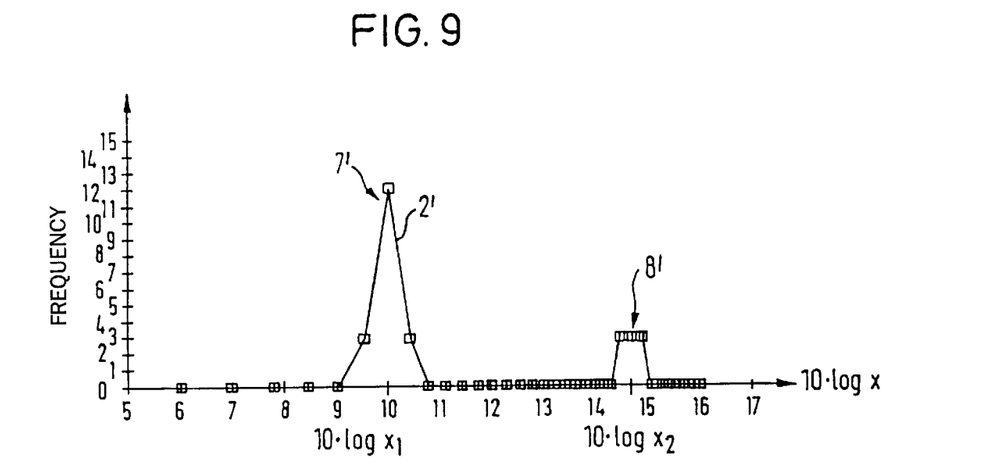

Through the logarithmic assessment of the width indexes the distance between the maxima which represent the narrower and broader code elements of the bar code is thus independent of the actual width of the code elements. Thus, factors such as the printing scale of the bar code, the reading distance and also the scanning speed which in each case bring about a scaling factor for the recognized width of the scan code elements are compensated by the logarithmic illustration. As long as the print ratio of two different scanned bar codes is selected to be the same the maxima of the frequency distributions shown in the logarithmic scale each have the same spacing from one another.

In a check of whether the maxima of the frequency distribution of the width indexes that are found correspond with the desired width indexes of the bar code to be recognized the same assessment functions f(x) and g(x) can be used in each case in a logarithmic assessment of the width indexes for different print widths, scanning speeds or scanning distances. An overlap of the maxima of the frequency distribution h(x) by the assessment function f(x) and also of the regions lying between the maxima by the assessment function g(x) is thus independent of the print scale of the bar code, the reading distance and also the scanning speed through the use of uniform assessment functions f(x) and g(x). It is only necessary to take account of an offset between the different frequency distributions.

Figure 10:
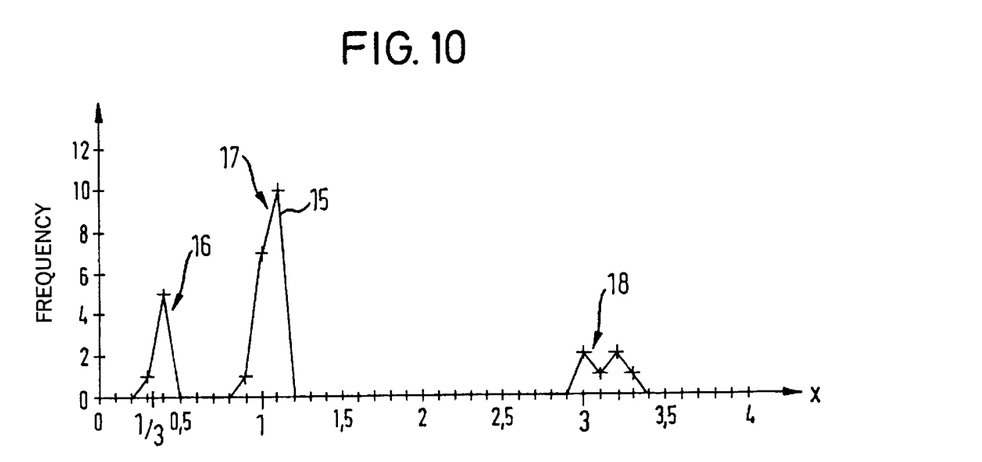

FIG. 10 shows the plot of a frequency distribution 15 of a two width code when based on the ratios of the width indexes of two sequential scanned elements instead of the width indexes. In a two width code with a print ratio of 3:1 the values 1/3, 1 and 3 thus result as possible ratios between sequential code elements. On scanning a bar code the maxima 16, 17, 18 shown in FIG. 10 thus arise which are arranged around the desired ratio values 1/3, 1 and 3.

The use of the ratios of the width indexes of two sequential scanned elements for the determination of the frequency distribution has, as does the already described logarithmic representation, the advantage that the scaling factors, which arise, for example through different printing scales of the bar code, different reading distances and also different scanning speeds, are compensated by the ratio formation. Moreover, the use of the ratios of the width indexes of two sequential scanned elements has the advantage, relative to the logarithmic portrayal, that with the known print ratio the position of the desired width index ratios can be fixedly set. In this case no offset need to be taken into account, as is the case with the logarithmic portrayal.

The evaluation of the scanned elements takes place, as described with respect to FIGS. 5 and 6, by the weighting of the frequency distribution with the assessment functions f(x) and g(x).

Whereas it was hitherto fundamentally assumed that the bars and gaps of a code element, i.e. bright and dark elements of a scanned region of an object are to be considered with equal value elements, and treated equally during a scan, it is also possible to consider the bars and gaps, i.e. the bright and dark elements separately. This is for example advantageous when, through print distortions, for example a smearing of the bars, these are generally broader than the corresponding gap elements. The width indexes for bars and for the gaps of theoretically the same width are determined differently as a result of the print distortions, so that an additional falsification of the frequency distribution that is found arises. In a determination of the frequency distribution, separately for bars and gaps in each case, or exclusively for bars, or exclusively for gaps, this falsification does not arise, so that the respective, separately found, frequency distribution leads to a better value for the calculated quality criterion.

Furthermore, it is possible for two sequential bar and gap elements to be considered as a total element in each case, since in this manner the errors in the width indexes of the bars and gaps which are caused by print distortions, for example smearing of the bars, are cancelled through the sum formation. In this respect it is on the one hand possible to select the total elements without overlap, i.e. one bar and the next adjoining gap element as the first overall element and the next bar and the subsequent gap elements in turn as the next overall element. It is however also possible to consider the total elements in an overlapping manner, so that one bar and the following gap element result in the first overall element whereupon the next total element is put together from the just considered gap element and the bar element which follows it.

Since, when combining two sequential code elements (bars and gaps) in a two bar code, total elements with three different widths (1+1, 1+2, 2+2 basic widths) exist, an evaluation is necessary in this case analogous to the evaluation of the three width code. In particular the frequency distribution has three maxima in this case (as in a three width code), so that the selectivity of the algorithm deteriorates relative to the evaluation of the normal frequency distribution of a two width code with two maxima.

We claim:

1. Method of recognizing and reading a bar code provided on an object and consisting of a number of code elements, characterized in that the object bearing the bar code is scanned by one or more scanning beams of a bar code reader, wherein each time a scanning beam sweeps over the object a scan is formed and bright and dark regions of the object swept over during a scan are recognized as scanned elements, in that, for at least some of the elements scanned during a scan; a width index is respectively formed which is representative for the width of the element in the scanning direction; in that the frequency of occurence of the width indexes that are found is in each case determined, and in that a conclusion is drawn on the presence of a bar code from the frequencies that are determined.

2. Method in accordance with claim 1, characterized in that the width indexes are selected from a plurality of predetermined discrete values.

3. Method in accordance with claim 1, characterized in that the time duration for the sweeping of the scanning beam over an element is determined during a scan and the width index for this element is determined from this time duration.

4. Method in accordance with claim 3, characterized in that the time duration is determined by counting a clock signal and the number of clock signals which are counted during the scanning of an element is used as the width index in each case.

5. Method in accordance with claim 1, characterized in that the determination of the width indexes in each case takes place for a number of sequential elements which define a scanning window, with the total width of the sequential elements being shorter than the running length of the bar code to be recognized.

6. Method in accordance with claim 5, characterized in that a decoding of the scanned bar code takes place when the presence of a bar code is recognized in at least two sequential scanning windows.

7. Method in accordance with claim 5, characterized in that the elements which lie within the scanning window are recognized as code elements of a bar code when the number of width indexes found, which in each case lie in a predetermined range around the corresponding desired width indexes of the code elements, is significantly larger than the number of the width indexes that are found which lie outside of these ranges.

8. Method in accordance with claim 1, characterized in that a quality criterion G is determined as a characteristic for the presence of a bar code and the scanned elements are recognized as code elements of a bar code when the quality criterion G reaches or exceeds a predetermined threshold value.

9. Method in accordance with claim 8, characterized in that the quality criterion G is determined in accordance with the following formulas:

$$G = \frac{\sum_{x \in L} f(x) \cdot h(x) - \sum_{x \in L} g(x) \cdot h(x)}{N},$$

wherein h(x) is the frequency distribution of the width indexes that are found, f(x) is an assessment function for h(x), g(x) is the complement of f(x), L is the quantity of width indexes found and N is the number of elements which are scanned within in a scanning window.

10. Method in accordance with claim 8, characterized in that the quality criterion G is determined in accordance with the following formula:

$$G = \frac{\sum_{x \in L} f(x) \cdot h(x)}{\sum_{x \in L} g(x) \cdot h(x)},$$

wherein h(x) is the frequency distribution of the width indexes that are found, f(x) is an assessment function for h(x), g(x) is the complement of f(x), and L is the quantity of width indexes found.

11. Method in accordance with claim 9, characterized in that the assessment function f(x) is selected as $$f(x) = \begin{cases} a & \text{for } x_{Si} - y \leq x \leq x_{Si} + z, i = 1, \ldots, n \\ 0 & \text{otherwise,} \end{cases}$$

wherein a is any desired number which is not equal to zero, in particular a=1, y, z are any desired numbers, n is the number of different desired width indexes of a code elements of the bar code to be recognized and $x_{si}$ are the different desired width indexes of the code elements of the bar code to be recognized.

12. Method in accordance with claim 10, characterized in that the assessment function f(x) is selected as $$g(x) = \begin{cases} 0 & \text{for } x_{Si} - z \leq x \leq x_{Si} + z, i = 1, \ldots, n \\ b & \text{otherwise.} \end{cases}$$

13. Method in accordance with claim 9, characterized in that the assessment function g(x) is selected as $$g(x) = \begin{cases} 0 & \text{for } x_{Si} - z \leq x \leq x_{Si} + z, i = 1, \ldots, n \\ b & \text{otherwise.} \end{cases}$$

14. Method in accordance with claim 10, characterized in that the assessment function g(x) is selected as $$g(x) = \begin{cases} 0 & \text{for } x_{S_i} - z \le x \le x_{S_i} + z, i = 1, \ldots, n \\ b & \text{otherwise} \end{cases}$$

15. Method in accordance with claim 13, characterized in that a and b are selected to be the same size.

16. Method in accordance with claim 8, characterized in that the quality criterion G is learned in a learning process.

17. Method in accordance with claim 9, characterized in that the quality criterion G and the assessment function f(x) and/or the complement g(x) are learned in a learning process.

18. Method in accordance with claim 10, characterized in that the quality criterion G and the assessment function f(x) and/or the complement g(x) are learned in a learning process.

19. Method in accordance with claim 1, characterized in that a decoding of the recognized bar code takes place with any usual decoding method.

20. Method in accordance with claim 1, characterized in that the frequency distribution of the width indexes that are found is smoothed, in particular by a low pass filter.

21. Method in accordance with claim 1, characterized in that the maxima of the frequency distribution of the width indexes that are found are determined and the width indexes that are found which are associated with maxima are compared with the desired width indexes of the code elements of the bar code to be recognized.

22. Method in accordance with claim 1, characterized in that instead of the width index of a scanned element the ratio of the width indexes of the scanned element and of the following or preceding element is used.

23. Method in accordance with claim 1, characterized in that in place of the desired width index of a code element the ratios of the desired width indexes of the code elements of the bar code to be recognized are used.

24. Method in accordance with claim 1, characterized in that the logarithm of the width indexes is used in place of the width indexes.

25. Method in accordance with claim 1, characterized in that a total width index is in each case determined for two sequential scanned elements.

26. Method in accordance with claim 1, characterized in that the width indexes for light and dark scanned elements are determined and/or evaluated separately.

27. Apparatus for the recognition and reading of a bar code provided on an object and consisting of a plurality of code elements, in particular for carrying out the method in accordance with one of the preceding claims, characterized by a bar code reader for the scanning of an object bearing the bar code by one or more scanning beams and also for the recognition of bright and dark regions of the object which are swept over during a scan as scanned elements, wherein a scan is in each case formed by a scanning beam sweeping over the object, by a width index determination unit, through which in each case a width index representative for the width of the element in the scanning direction can be determined, at least for some of the elements scanned during a scan, by a counting unit through which the frequency of occurrence of the width indexes that are found can be determined, and by an assessment unit for the assessment of the frequencies that are found and for the classification of the scanned elements as part of a bar code.

* * * * *

UNITED STATES PATENT AND TRADEMARK OFFICE
CERTIFICATE OF CORRECTION

PATENT NO.    : 6,039,253
DATED         : March 21, 2000
INVENTOR(S)   : Jürgen Reichenbach, et al.

Page 1 of 1

It is certified that error appears in the above-identified patent and that said Letters Patent is hereby corrected as shown below:

On the Title page:
Under "[73] Assignee:" change "Waldkirck" to --Waldkirch--

After "[22] Filed: Jun. 10, 1998", insert:
--[30] Foreign Application Priority Data June 11, 1997 [DE] Germany 197 24 711--

Signed and Sealed this

Nineteenth Day of June, 2001

Attest:

NICHOLAS P. GODICI
*Attesting Officer*  *Acting Director of the United States Patent and Trademark Office*